(12) United States Patent
Williamson

(10) Patent No.: US 6,738,345 B1
(45) Date of Patent: May 18, 2004

(54) METHOD FOR FAILOVER MANAGEMENT IN A SYNCHRONOUS OPTICAL NETWORK USING STANDARD PROTOCOLS

(75) Inventor: H. Keith Williamson, Tempe, AZ (US)

(73) Assignee: Motorola, Inc., Schaumburg, IL (US)

( * ) Notice: Subject to any disclaimer, the term of this patent is extended or adjusted under 35 U.S.C. 154(b) by 854 days.

(21) Appl. No.: 09/598,090

(22) Filed: Jun. 21, 2000

(51) Int. Cl.⁷ .................................................. H04L 1/22
(52) U.S. Cl. ..................................... 370/217; 370/220
(58) Field of Search ................................. 370/216, 217, 370/218, 219, 220, 225, 226, 227, 228

(56) References Cited

U.S. PATENT DOCUMENTS

| | | | |
|---|---|---|---|
| 5,870,382 A | 2/1999 | Tounai et al. | 370/220 |
| 6,392,992 B1 * | 5/2002 | Phelps | 370/225 |
| 6,614,753 B2 * | 9/2003 | Ikawa | 370/222 |

FOREIGN PATENT DOCUMENTS

| WO | 0007313 | 2/2000 | H04J/3/16 |
|---|---|---|---|

\* cited by examiner

*Primary Examiner*—Melvin Marcelo
(74) *Attorney, Agent, or Firm*—Jeff D. Limon; Kevin D. Wills

(57) ABSTRACT

In synchronous optical communications network, a communications node (FIG. 1, 10) is in communications with a second communications node (12) and desires to fail all traffic over from a working link (120) to a protection link (130) without requiring coordination with the second communications node (12). In order to bring about the fail over, the first communications node (12) fabricates an alarm which expresses that a failure has occurred at a location external to the first communications node (10). When the second communications node (12) receives the alarm, it changes the state of an indicator which is not intended to influence the behavior of the first communications node (10). Upon reception of the indication that the second communications node (12) is receiving traffic over the protection link only, the first communications node (10) begins transmitting all traffic over the protection link (130).

13 Claims, 3 Drawing Sheets

# METHOD FOR FAILOVER MANAGEMENT IN A SYNCHRONOUS OPTICAL NETWORK USING STANDARD PROTOCOLS

FIELD OF THE INVENTION

The invention relates generally to the field of data communications and, more particularly, to methods of managing failover in a synchronous optical communications network.

BACKGROUND OF THE INVENTION

In a synchronous optical communications network, interfaces between adjacent communications nodes can undergo degradation from a variety of sources. These sources include failures of physical link layer devices, inadvertent severing of the optical communications link, and a variety of other causes. When these failures occur, processing entities within the synchronous optical communications network must quickly failover to a secondary interface in order to minimize the information lost during the period prior to the transition to the secondary interface.

A typical technique for bringing about a failover in response to a degradation in the quality of the channel between adjacent communications nodes is to provide complete redundancy in all critical interface components. However, this requires additional complexity especially when each communications node is executing an application in which communications protocols are stacked one on top of another. Under these circumstances, applications which are executing within each communications node must be synchronized in order to bring about a graceful failover from one processing entity to another. Additionally, all state information used by each particular processing layer within the communications nodes must be conveyed to the secondary processing entity in order to enable processing operations to be harmonized within the network environment.

Complete redundancy in critical interface components also requires that any failover management applications be tailored to the particular processing environment of each type of communications node used within the synchronous optical communications network. Thus, network equipment providers are required to custom design equipment which operates at both ends of each optical communications link in order to ensure a harmonious failover of communications from one interface to another. This increases the cost and complexity in constructing reliable synchronous optical communications networks and, in turn, raises the cost of high quality data communications services provided to consumers.

Therefore, it is highly desirable to employ a method for link management in a synchronous optical communications network using standard protocols. This would allow network equipment providers to make use of standard equipment which operates using standardized rules for failover to secondary links. The method would additionally allow a reduction in the cost of implementing reliable synchronous optical communications networks, and thus benefits consumers who rely on these services.

BRIEF DESCRIPTION OF THE DRAWINGS

The invention is pointed out with particularity in the appended claims. However, a more complete understanding of the present invention may be derived by referring to the detailed description and claims when considered in connection with the figures, wherein like reference numbers refer to similar items throughout the figures, and:

DESCRIPTION OF THE PREFERRED EMBODIMENT

A method for failover management in a synchronous optical network using standard protocols enables a communications node to switch traffic to a second interface without requiring the use of specialized applications which harmonize the failover with other communications nodes within the network environment. The method is particularly useful within more intelligent "end" systems which function to originate and terminate communications traffic. Within these elements, a failover must be carefully managed to ensure that all protocol state information is preserved during the failover, thus maintaining harmony within the network environment.

Figure 1:
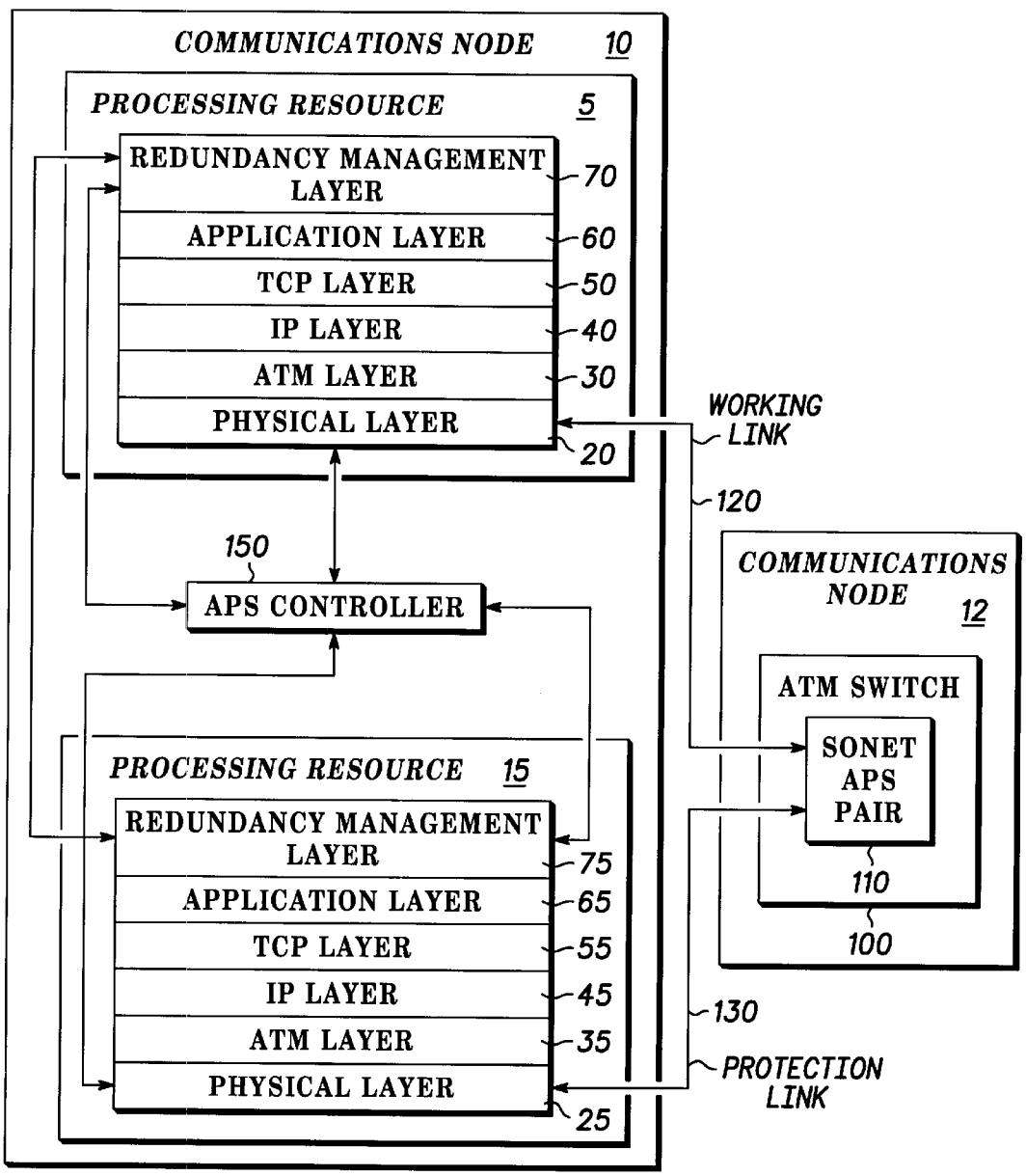
FIG. 1 is a block diagram of two communications nodes operating at both ends of a synchronous optical communications link in accordance with a preferred embodiment of the invention.

FIG. 1 is a block diagram of two communications nodes operating at both ends of a synchronous optical communications link in accordance with a preferred embodiment of the invention. In FIG. 1, processing resources 5 and 15 (of communications node 10) are communicating with asynchronous transfer mode (ATM) switch 100 using working link 120 and protection link 130, respectively. Working link 120 and protection link 130 are representative of a synchronous optical network such as a SONET/Synchronous Digital Hierarchy (SONET/SDH). As known to those of skill in the art, SONET/SDH are standards which describe a hierarchy of synchronous optical communication signal formats used by public carriers for global high-speed data transmission. These are physical layer framing standards that provide high-speed, low bit-error-rate optical transport for a variety of other layer 1 and layer 2 protocols such as T1/E1, T3/E3, PPP, and ATM.

In a preferred embodiment, communications node 12 includes ATM switch 100, which itself incorporates a SONET automatic protection switching (SONET APS) pair 110. Although communications node 12 includes ATM switch 100, nothing prevents the use of any other device which supports SONET APS such as a SONET multiplexer. The operation of SONET APS pair 110 is defined by conventional telecommunication standards such as the Telcordia GR-253 standard. In accordance with this standard, working link 120 can be visualized as a primary link, while protection link 130 can be visualized as a secondary or backup link. By way of example, and not by way of limitation, links 120 and 130 operate at 155 megabits per second. Although not shown in FIG. 1, ATM switch 100 is a network element which likely includes connections to other ATM devices. Additionally, it is anticipated that the complexity of the tasks performed by communications node 12 is much simpler than those performed by communications node 10.

Desirably, processing resource 5 communicates with communications node 12 through working link 120. Similarly, processing resource 15 communicates with communications node 12 through protection link 130. Communication by way of working and protection links 120 and 130 is facilitated by way of the optical devices which are characteristic of physical layers 20 and 25, respectively. Physical layers 20 and 25 serve to provide framing and transmission of data from processing resources 5 and 15, as well as to provide deframing and reception of received data to processing resources 5 and 15. In accordance with a preferred embodiment of the invention, communications traffic between communications nodes 10 and 12 is primarily facilitated through the use of working link 120, while protection link 130 is occasionally used in response to a degradation in the quality of working link 120. These degradations include, but are not limited to, an increase in the bit error rate of working link 120, a total failure of working link 120, or various other degradations in the channel quality of working link 120.

In addition to physical layer 20, processing resource 5 implements various other layers, or protocol stacks which operate on top of physical layer 20. In the example of FIG. 1, ATM layer 30 overlays physical layer 20, allowing ATM frames to be formatted by physical layer 20 for transmission along working link 120. ATM layer 35 interacts in a similar manner with physical layer 25 within processing resource 15. It is noteworthy that the present invention is not limited to the use of an ATM layer within processing resources 5 and 15. The principles of the invention can be practiced using other layers which operate on top of physical layer 20 and interact with the physical layer. These include Packet Over SONET, telephony, aggregate T1 lines, or virtual tributaries.

Processing resources 5 and 15 are shown as incorporating other layers such as Internet Protocol (IP) layers 40 and 45 transmission control protocol (TCP) layers 50 and 55 and application layers 60 and 65. Preferably, redundancy management layers 70 and 75 are coupled to application layers 60 and 65. These allow communications node 10 to operate in a manner which allows processing resource 15 to perform as a "hot standby" for processing resource 5. In the context of the present application, a hot standby denotes a processing resource which receives information from a communications link, such as protection link 130 but does not initiate communications traffic from communications node 10 to communications node 12.

In accordance with the GR-253 APS protocol standard, both communications nodes 10 and 12 negotiate with each other to establish a favorable SONET APS operating mode. Desirably, communications node 10 solicits the use of a 1+1 unidirectional operating mode resulting in this operating mode being agreed upon for use by communications node 12. In this operating mode, both communications nodes 10 and 12 transmit simultaneously using both working and protection links 120 and 130. When receiving data, communications nodes 10 and 12 are capable of selecting either working link 120 or protection link 130 without any acquiescence from the other node. However, each of communications nodes 10 and 12 is required by the GR-253 APS protocol standard to provide an informational message which indicates whether the communications node is currently receiving traffic from the working link or the protection link.

In accordance with an aspect of the present invention, when communications node 10 desires to terminate communications traffic over working link 120, an alarm message can be transmitted over the link. This alarm message expresses that a failure has occurred in a network entity which is external to communications node 10. In a preferred embodiment in which communications node 10 represents an end system (i.e. a network element that originates and terminates network traffic), this alarm is generated by APS controller 150 within the communications node in order to force traffic onto protection link 130 exclusively. In response to the alarm message, communications node 12 ceases reacting to traffic received by way of working link 120, and responds only to traffic received through protection link 130. Preferably, communications node 12 informs communications node 10 of this action by way of protection link 130. Upon receiving this informational message, communications node 10 begins transmitting traffic exclusively over protection link 130. This transition is brought about through the actions of redundancy management layers 70 and 75 which synchronize the failover of communications traffic from processing resource 5 to processing resource 15.

By failing over from working link 120 to protection link 130, the present invention allows, among other things, communications node 10 to operate using processing resource 15 and protection link 130 while requiring communications node 12 to perform only in accordance with the provisions of GR-253 APS protocol standard. This allows communications node 10 to operate in a 1:1 bi-directional mode with communications node 12 in accordance with the GR-253 standard. However, while communications node 10 operates in a 1:1 bi-directional mode, no explicit instruction to change the mode of operation has been issued to communications node 12. Thus, communications node 12 continues to operate in the 1+1 unidirectional mode with its behavior manipulated through the actions of communications node 10.

Preferably, a substantial portion of the failover functions is controlled by way of APS controller 150. APS controller 150 serves to generate alarms, track the status of working and protection links 120 and 130, control the operation of redundancy management layers 70 and 75, as well as operate in conjunction with the redundancy management layers to control any data buffering which is required to ensure a smooth transition from the working to the protection links. APS controller 150 also includes communications paths with physical layers 20 and 25 of the corresponding processing resources in order to reduce latency or increase the performance of the controller operating within processing resources 5 and 15.

Figure 2:
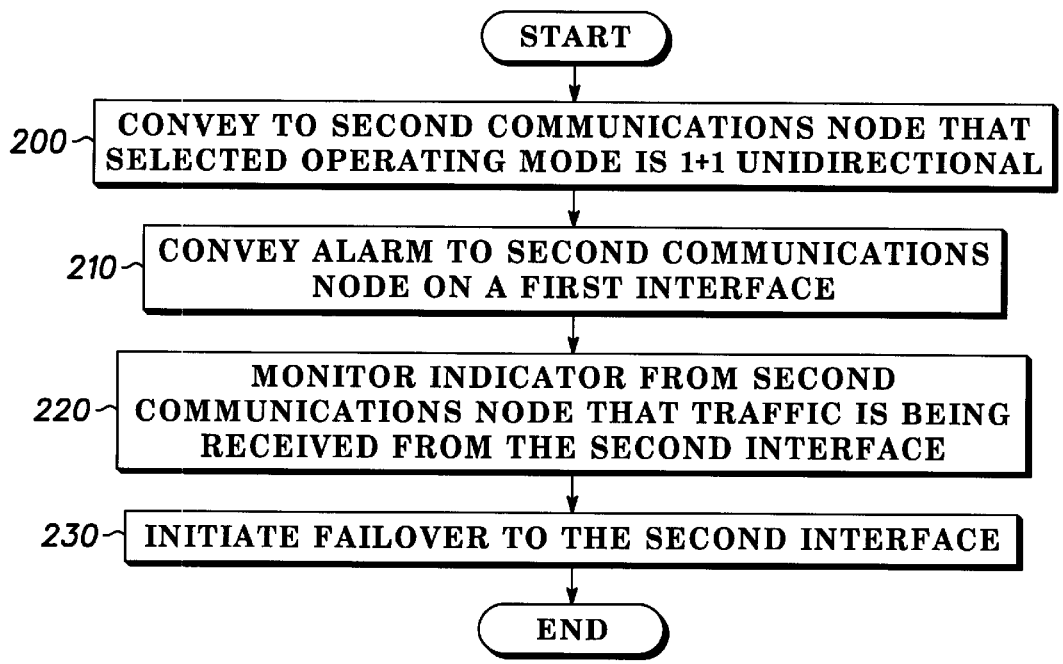
FIG. 2 is a flowchart of a method for failover management in a synchronous optical network performed in accordance with a preferred embodiment of the invention.

FIG. 2 is a flowchart of a method for failover management in a synchronous optical communications network performed in accordance with a preferred embodiment of the invention. The system of FIG. 1 is suitable for performing the method of FIG. 2. The method of FIG. 2 begins at step 200 where a first communications node conveys to a second communications node that the chosen automatic protection switchover mode will be the 1+1 unidirectional mode as a defined in the GR-253 APS protocol standard.

The method continues at step 210 where the first communications node conveys an alarm to the second communications node. In a preferred embodiment, this alarm is fabricated within processing resource 5 and is not representative of a genuine failure condition. In accordance with the GR-253 standard, the alarm can be used to express to the second communications node that a failure has occurred external to the first communications node.

At step 220, an indicator from the second communications node is received by the first communications node.

This indicator can correspond to the K1/K2 indicator identified in the GR-253 standard and is used to identify whether the second communications node is currently receiving traffic using the working or the protection link. Also in accordance with the GR-253 standard, the K1/K2 indicator is provided to the first communications node for informational purposes only, and is not intended to influence a behavior of the first communications node.

At step 230, the first communications node reads the indicator from the second communications node and initiates a failover to the second interface. Although this indicator is transmitted for informational purposes only, the first communications node makes use of this indicator to begin transmission on the protection link thus causing communications to continue using the protection link only.

Figure 3:
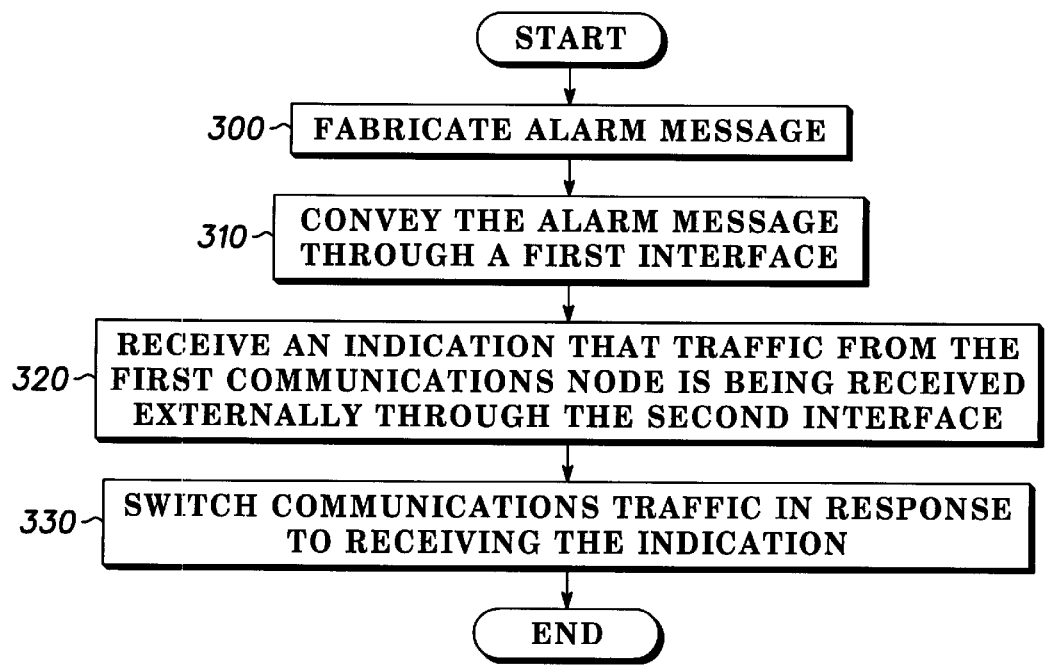
FIG. 3 is a flowchart of another method for failover management in a synchronous optical network performed in accordance with a preferred embodiment of the invention.

FIG. 3 is a flowchart of another method for failover management in a synchronous optical network performed in accordance with a preferred embodiment of the invention. Communications node 10 of FIG. 1, operating in accordance with the 1+1 unidirectional mode as defined by the GR-253 APS protocol standard, is suitable for performing the method of FIG. 3. At step 300, an alarm message is fabricated within the communications node. Desirably, the alarm message fabricated by the communications node express is that a network element which is coupled to the communications node has failed.

At step 310, the communications node conveys the alarm message through a first interface. At step 320, the communications node receives an indication that traffic transmitted from the communications node is being received by an external receiving element by way of the second interface only. At step 330, the communications node switches traffic to the second interface. This step is executed in response to receiving the indication of step 320.

Figure 4:
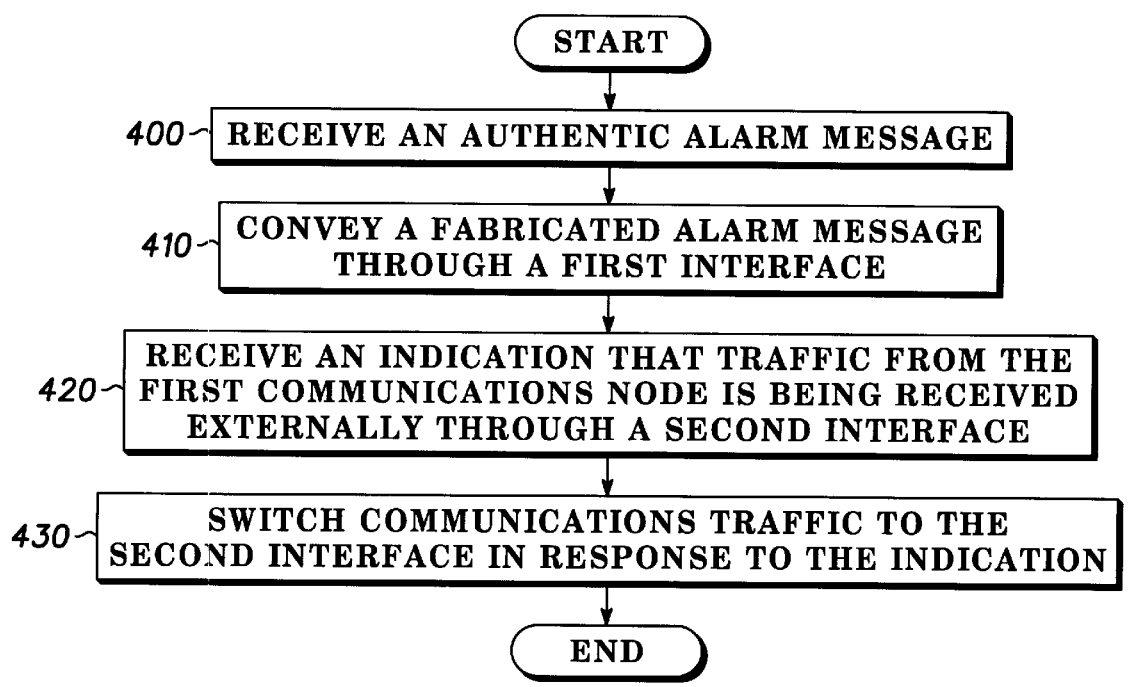
FIG. 4 is a flowchart of a method for failover management which is responsive to an authentic alarm in a synchronous optical network performed in accordance with a preferred embodiment of the invention.

Although the invention has been described as primarily pertaining to communications node 10 (FIG. 1) fabricating an alarm on a working link in order to failover to a protection link, nothing prevents communications node 10 fabricating an alarm based on an authentic alarm being generated by communications node 12. In this case, communications node 10 receives the authentic alarm indication over working link 120 and selects to receive traffic over protection link 130. Communications node 10 then monitors the appropriate indication from communications node 12, such as the K1/K2 information. When communications node 10 receives an indication that communications node 12 has begun receiving traffic exclusively using protection link 130, communications node 10 can fail all traffic over to the protection link. FIG. 4 (herein) describes this embodiment in greater detail.

FIG. 4 is a flowchart of a method for failover management which is responsive to an authentic alarm in a synchronous optical network performed in accordance with a preferred embodiment of the invention. The apparatus of FIG. 1 is suitable for performing the method of FIG. 4. At step 400, a first communications node receives an authentic alarm which is transmitted in response to an unusual or failure condition either within the second communications node, or its external environment. Upon receiving the authentic alarm, it may be prudent for the first communications node to quickly switch traffic from the first interface to the second interface. Thus, the first communications node executes step 410 in which the first communications node fabricates and conveys an alarm.

The advantage of the communications node fabricating an alarm in response to receiving the authentic alarm is that this action precludes the undesirable condition wherein the second communications node is allowed to receive on one of the two interfaces while transmitting on the other, such as is possible when operating in a 1+1 unidirectional mode as described previously herein. By fabricating the alarm, the first communications node can exert control over the communications link and coerce operation in the 1:1 bi-directional mode using the protection link without issuing explicit instructions to change an operating mode of the second communications node.

The method continues at step 420 where an indication that traffic which is being transmitted from the first communications node is being received by the second communications node using the protection link. Preferably, this is conveyed as an informational indication, such as the K1/K2 indicator which has been previously discussed. Desirably, the indicator is not intended by the second communications node to influence the behavior of first communications node. This indication is used by the first communications node in order to determine when to failover to the protection link. In step 430, the failover is accomplished and communications traffic is switched to the second interface.

It is noteworthy that steps 420 and 430 can be executed aside from the execution of steps 400 and 410. Thus, nothing prevents the second communications node from occasionally switching from the working link to the protection link for a reason that is not known to the first communications node. In this event, the first communications node can monitor the protection link and failover to the protection link whenever an indicator such as the K1/K2 information indicates that it is appropriate to do so.

In conclusion, a method for failover management in a synchronous optical network using standard protocols enables a communications node to switch traffic to a second interface without requiring the use of specialized applications which harmonize the failover with other communications nodes within the network environment. Although useful in other network elements, the method is especially useful within more intelligent "end" systems which function to originate and terminate communications traffic. The particular utility of the methods of the invention can be critical to operation within end systems since these systems implement multi-level protocol stacks. Within these elements, a failover must be carefully managed to ensure that all protocol state information is preserved during the failover, thus maintaining harmony within the network environment.

Accordingly, it is intended by the appended claims to cover all modifications of the invention that fall within the true spirit and scope of the invention.

What is claimed is:

1. In a synchronous optical network, wherein said synchronous optical network includes a first and second communications node which communicate with each other through a first and second interface using an automatic protection mechanism, a method for causing said second communications node to receive using a second interface, said method comprising the steps of:

said first commnunications node conveying to said second communications node that said first communications node is transmitting on said first and second interface;

said first communications node fabricating an alarm, said alarm being conveyed to said second communications node using said first interface said first communications node receiving an indication that said second communications node is receiving from said second interface only; and said first communications node transmitting using only said second interface in response to receiving said indication.

2. The method of claim 1, wherein said synchronous optical network is used to convey information which has been formatted into asynchronous transfer mode (ATM) frames.

3. The method of claim 1, wherein said synchronous optical network is used to convey packetized data frames.

4. The method of claim 1, wherein said alarm expresses that a network element which is coupled to said first communications node has failed.

5. The method of claim 1, wherein said transmitting step further comprises the step of implementing processing functions using a separate resource which is coupled to said second interface.

6. The method of claim 1, wherein said indication from said second communications node is not intended by said second communications node to influence a behavior of said first communications node.

7. In a communications node which includes first and second interfaces that communicate through a synchronous optical network using an automatic protection mechanism, a method for switching communications traffic to said second interface only, comprising the steps of:

fabricating an alarm message;

conveying said alarm message through said first interface;

receiving, by way of said second interface, an indication that traffic transmitted from said communications node is being received externally through said second interface; and switching communications traffic to said second interface only, in response to receiving said indication.

8. The method of claim 7, additionally comprising the step of said first communications node receiving an authentic alarm from said second communications node performing said fabricating step in response to receiving said authentic alarm.

9. The method of claim 7, wherein said synchronous optical network is used to convey information which has been formatted into asynchronous transfer mode (ATM) frames.

10. The method of claim 7, wherein said synchronous optical network is used to convey packetized data frames.

11. The method of claim 7, wherein said communications node is an end system and wherein said alarm message expresses that a network element which is coupled to said communications node has failed.

12. The method of claim 7, wherein said switching step further comprises the step of implementing processing functions using a separate resource which is coupled to said second interface.

13. The method of claim 7, wherein said indication is not intended to influence a behavior of said communications node.

* * * * *